United States Patent [19]
Woolman

[11] 3,778,911
[45] Dec. 18, 1973

[54] CLASSROOM FOR PAIRED LEARNING

[76] Inventor: Myron Woolman, 4828 16th St., N.W., New York, N.Y. 20011

[22] Filed: June 1, 1972

[21] Appl. No.: 258,811

Related U.S. Application Data

[63] Continuation of Ser. No. 41,258, May 28, 1970, abandoned.

[52] U.S. Cl............................ 35/60, 35/8 R, 52/234
[51] Int. Cl............................................... E04h 3/08
[58] Field of Search......................... 35/60; 350/291; 52/27, 28, 33, 36, 171, 173, 234, 237, 238, 239

[56] References Cited
UNITED STATES PATENTS

| | | | |
|---|---|---|---|
| 232,599 | 9/1880 | Crandall | 35/60 |
| 532,253 | 1/1895 | Watson | 52/239 X |
| 1,018,373 | 2/1912 | Robbins | 35/60 |
| 2,286,570 | 6/1942 | Pollack | 52/28 X |
| 2,858,579 | 11/1958 | Koelb | 52/234 |
| 3,107,400 | 10/1963 | Anderson | 52/238 X |
| 3,160,451 | 12/1964 | Lewis | 312/194 |
| 3,366,415 | 1/1968 | Cooper | 35/60 UX |
| 3,370,389 | 2/1968 | Macaluso | 52/239 |
| 3,531,898 | 10/1970 | Facemire | 35/60 X |
| 3,559,352 | 2/1971 | Magnuson | 52/36 |

OTHER PUBLICATIONS

Spring, B. P., "Plug-in schools: Next Step in Educational Design?" Pages 68–73 of August 1963 Architectural Forum Magazine
Audiovisual Instruction Magazine for May 1961, page 209 only.

*Primary Examiner*—Harland S. Skogquist
*Attorney*—Gary L. Jordan

[57] ABSTRACT

A classroom is presented in which a plurality of learners may engage in paired learning and psycho-motor activities in a manner to increase the learning effectiveness of each of these two types of learning programs. A first area is provided for containing paired learning devices and a second area is provided for containing simulator equipment for psycho-motor activities.

30 Claims, 7 Drawing Figures

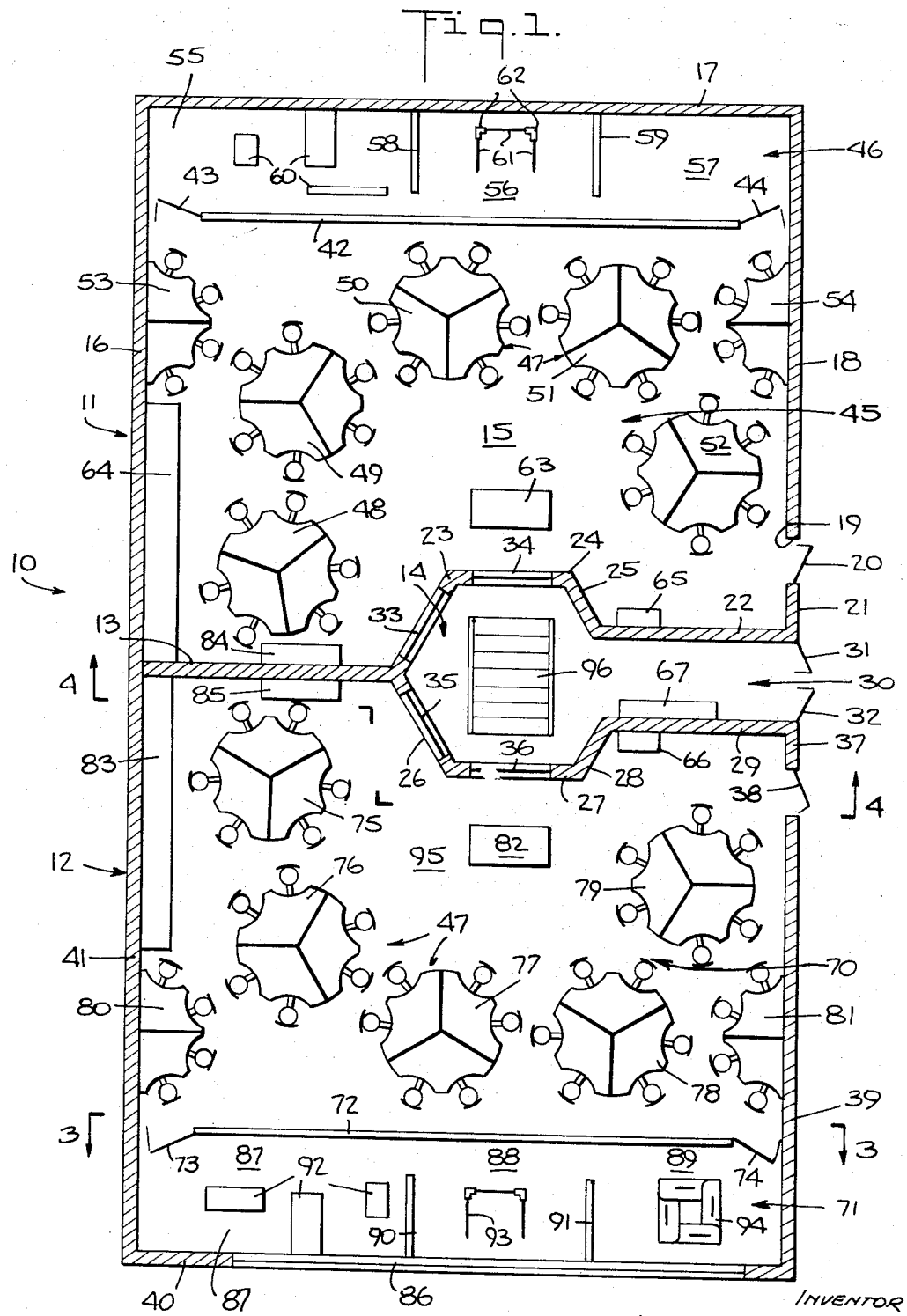

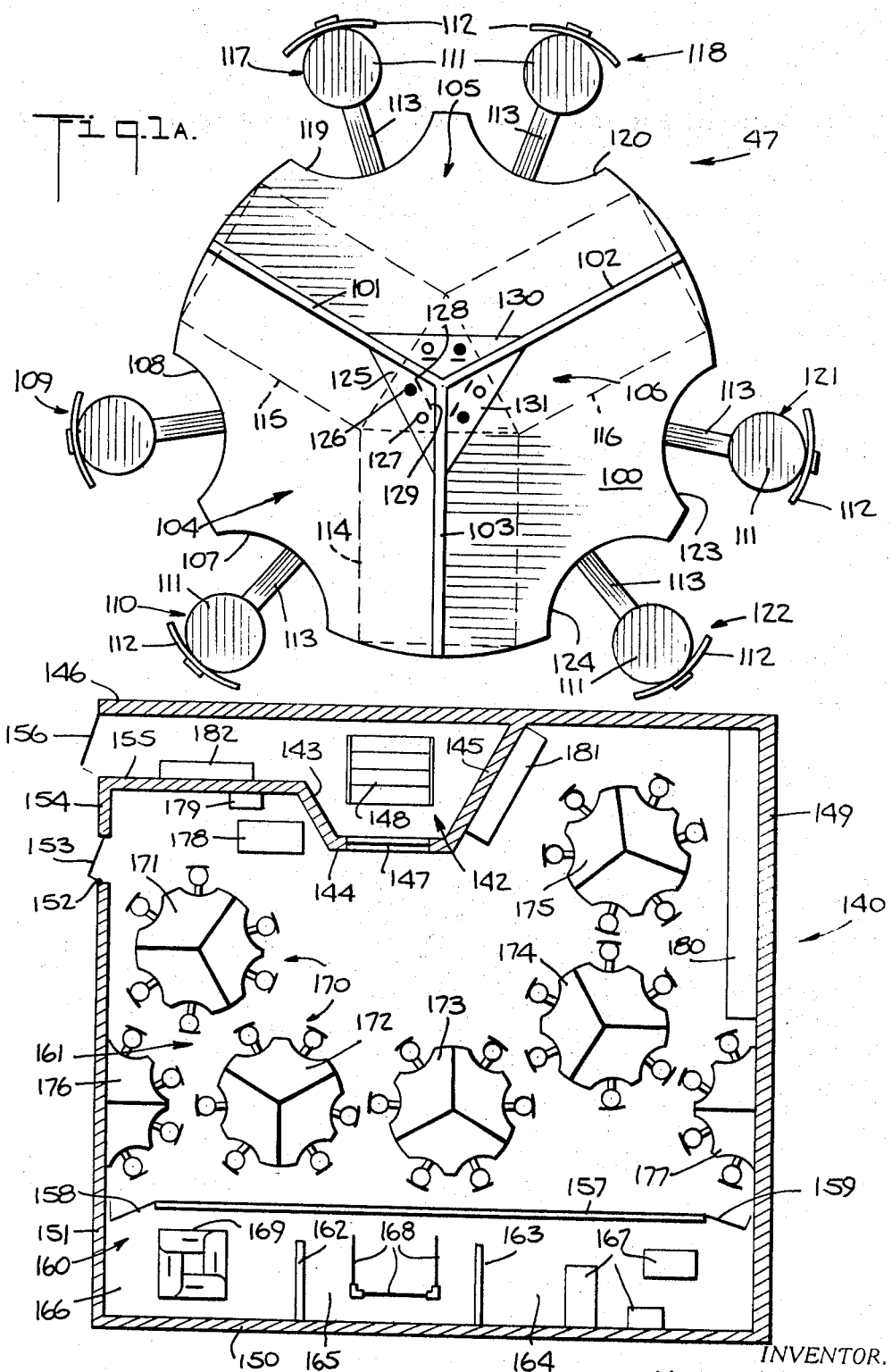

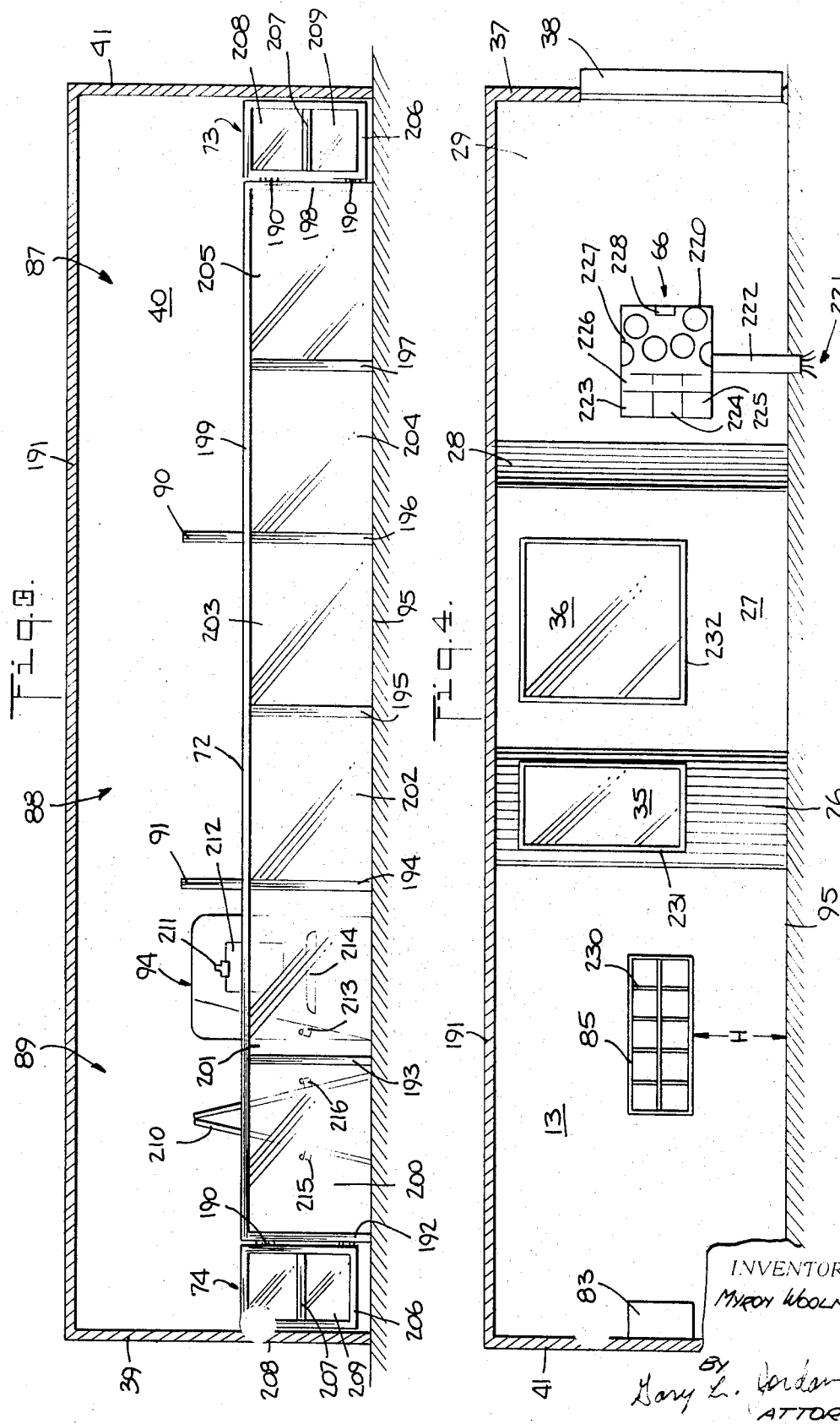

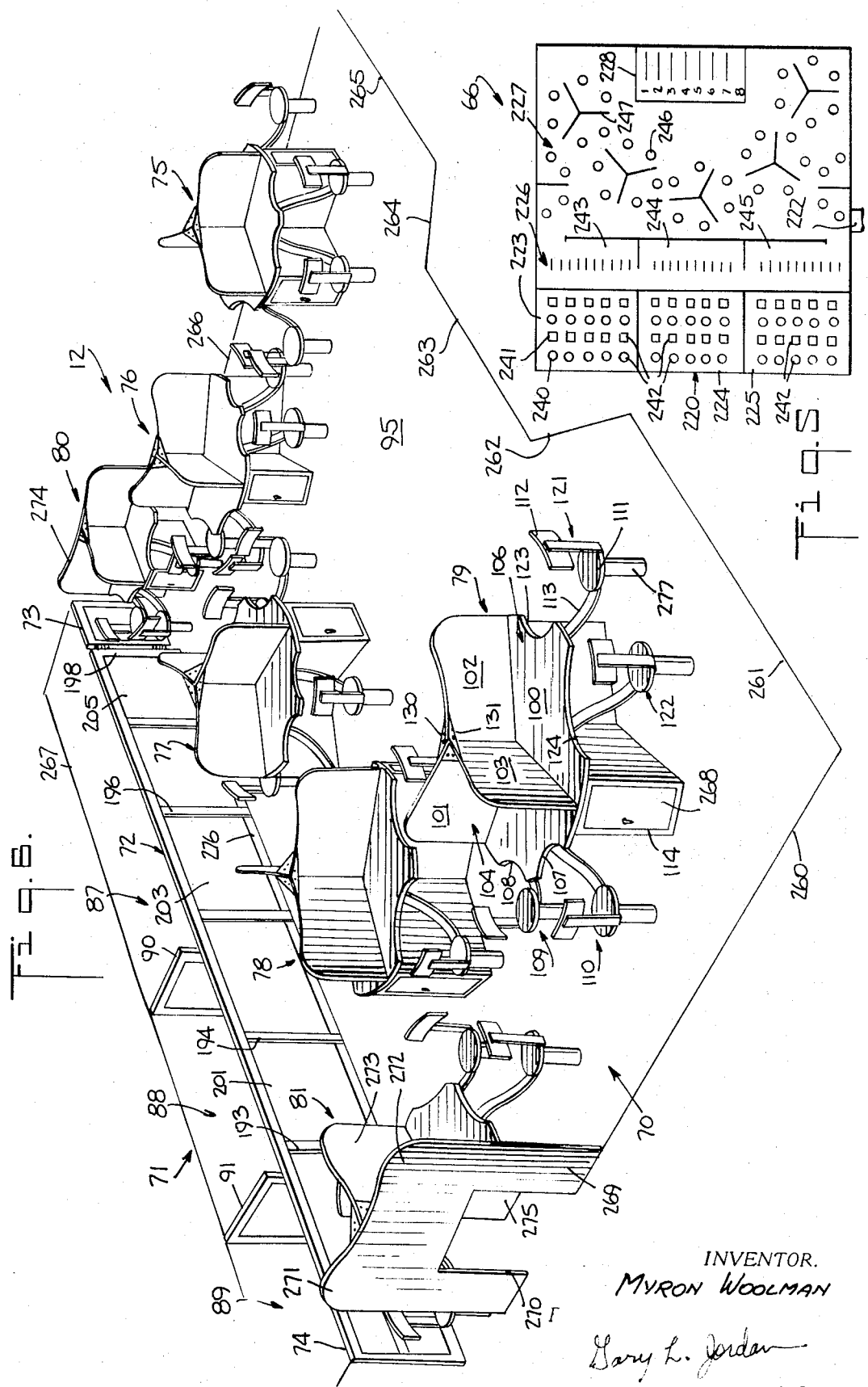

CLASSROOM FOR PAIRED LEARNING

CROSS-REFERENCE TO RELATED APPLICATION

This application is a continuation of now abandoned application Ser. No. 41,258, filed May 28, 1970.

BACKGROUND OF THE INVENTION

The present invention relates to a classroom designed to increase learning effectiveness. More particularly, it relates to a classroom in which paired learning may be conducted and in which psycho-motor activities may be scheduled in a flexible and interrelated manner with respect to the sequential program segments required to complete an instructional program in paired learning.

The prior art for classroom designs consists of classrooms containing various desks for individual use or carrels for multiple student use in an individualized manner. Usually a teacher desk of simple design is also provided. Various audio-visual equipment, cabinets, etc. may also be provided.

There is no prior art known to the inventor for a classroom designed to facilitate paired learning as described in the inventor's copending application entitled "DEVICE FOR PAIRED LEARNING AND PROCESS THEREOF" Ser. No. 41,167 filed May 28, 1970 and abandoned in favor of a continuation Ser. No. 289,587 filed Sept. 18, 1972.

The classroom described herein is comprised of at least three walls, a floor and a ceiling which are interconnected in order to enclose a classroom space. The classroom space is separated into a first area and a second area by a divider panel. This panel is preferably transparent so that the learners on either side thereof may view one another. The first area of the classroom, as separated by the divider panel, is used for presenting paired learning programs to the learners while they are positioned at paired learning devices. These paired learning devices are designed to permit learner pairs to work in work spaces designed for focusing the perception of the learner pair with respect to a presented program for paired learning. The second area, separated by the divider panel, is used for presenting to the learners a program of psycho-motor activities which is coordinated with the program for paired learning being mastered at the paired learning devices in the first area. Simulator equipment and/or other three dimensional objects are located within the second area in order to carry out the purposes of providing for the coordinated psycho-motor activities.

The division of the classroom into the first area and the second area has three major functions.

1) It permits a continuing cycle of variation in pattern of activity from speech and symbolic skills to psycho-motor skills.

2) It permits learners to immediately practice language skills in an activity setting which requires tactile, kinesthetic sensory involvement to improve learning and retention.

3) It releases space for learners requiring movement in the first area.

In the preferred form illustrated in the drawings, five paired learning devices each accommodating three pairs of learners and two paired learning devices each accommodating two pairs of learners are provided. The simulator area equipment can be three dimensional objects which can require social interaction and cooperation between the learners in order to effectively use the equipment or it can consist of individualized equipment to allow artistic free expression as well as the development of other psycho-motor skills.

In operation the complete program of paired learning is divided into a number of program segments. Psycho-motor activities are also divided into a number of coordinated program segments. The paired learning program segments are then assigned to various work space positions within the first area of the classroom so that when a learner pair is working upon a given program learning segment the pair is seated at an assigned work space. When the paired learning program is presented from materials which can be moved between the work spaces there is increased flexibility in using the plurality of work spaces for the plurality of program segments. When using complex audio-visual equipment in the work spaces, it is more convenient to assign given program segments to given work spaces in such a manner that when the learner pairs are working on a given program segment they sit at an assigned work space. The psycho-motor activities can only be performed in the work areas within the second area in which the required equipment is located.

At the start of a paired learning program, all of the learners in the classroom can be positioned as learner pairs at the work spaces provided by the paired learning devices in the first area. The first program segment or subsegment is then given to each of the learner pairs. As it will require different times of completion, some of the learner pairs will complete this first program segment and be ready to move to either a psycho-motor activity or another paired learning program segment depending upon which is to be next presented. In order to provide for this difference in rates of program segment and subsegment completion time and to assure that each of the learner pairs when they complete a given program segment can be assigned to a new unoccupied work space within the classroom, an excess number of work spaces are provided in the classroom over that numerically required for the learner pairs.

Generally, the program of paired learning presented at the paired learning devices consists of audio-visual and/or workbook materials designed for reading comprehension, the learning of symbolic skills and language, and social interaction skills. The psycho-motor activities program which is coordinated with the paired learning program presented at the paired learning devices provides activities in which the language and symbols learned in the paired learning program can be employed in a coordinated three dimensional activity, either simulated or actual. Hence language learning, social interaction and reading comprehension skills are developed in the course of coordinated activity between the two areas. Individual artistic expressive skills and psycho-motor developmental skills are also provided for in the second area.

By setting up the paired learning program and its associated and coordinated psycho-motor activities program in this manner, each of the learners can be moved through, in a systematic fashion, a number of sequential experiences provided in each of the classroom areas.

It has been found important to the learners that they receive some indication of their successful completion of each of the sequential program segments and subsegments. In order to provide for this indication the learner pairs are moved to new work spaces in the first area and/or to new work areas in the second area at each completion point. This movement is an unambiguous physical sign of achievement and it sets up a flow which functions as a rhythmic motivating force for all learners using the classroom.

If desired, individual skill analyses can be made of each of the learners upon their entry into the classroom situation so that the scheduling of the successive program segments can be individually tailored with respect to each of the learners.

A learner guidance means can be provided in order to give the classroom teacher and the learners guidance information as to which work space they should next proceed to once they have completed a given program segment. The learner guidance means has a classroom information display panel which is composed of a series of display panels arranged in a graphic representation of the classroom floor plan. Each work space in the first area and each work area in the second area are shown graphically on this information display panel. Character display elements are arranged on the display panels at each work space and work area for displaying to the learners identification symbols for each of them. Their identification symbols appear in the character display element at the work space or area where they are to master the next scheduled program segment. These character display elements collectively comprise the learner display means. The face panel of the learner guidance means is exposed in the classroom in a prominent position and consists of separate display panels for each of the three work areas of the second classroom area, a psycho-motor activities area learner identification panel and a paired learning program guidance display panel, and a learner identification panel.

The input signals into this guidance means consist of those signals received from a learner scheduling means and from a completion signalling means which allows signals to be given to said guidance means when the learners complete a given program segment or subsegment. The initial information into the guidance means consists of the spatial arrangement of the classroom. This information will normally be fixed but can be changed if the number of work spaces is changed.

The assigned sequences of program segments are scheduled so that at least one learner pair is established for each of the learners in order to assure that each learner covers his particular learning requirements in a pattern of concomitant variation with a partner. This scheduling and the classroom spatial arrangement information can most easily be supplied to the guidance means by punched cards which can be read by a card reader associated with the guidance means.

Ideally, the learner guidance means is controlled by a small computer which has a storage capacity to handle the sequential arrangement of the program segments and to identify the work spaces as related to program segments. The completion signals are received within the learner guidance means. They are channeled to a completion signal recording means which in turn is connected to a memory bank and comparator means, both of which consist of appropriate electronic circuit devices. The classroom spatial arrangement is fed into the comparator means through the classroom spatial arrangement means which can consist of punched cards and an appropriate card reader as mentioned above. This information then presets the comparator means so that when completion signals and scheduling signals are received by the comparator means they are compared with the existing work space and area positions in order to then send guidance signals to the guidance signalling means which controls the learner display means on the display panel. The computer then can select the next work space in the classroom which is free and an identification of both of the learners completing the segment is then displayed on a graphic representation of the work spaces in the classroom. The learners then see from this displayed graphic information that they should proceed to the work space selected by the computer for the next program segment. The program materials can be moved to this work space or they can be fixed into the work space in which event the computer must be provided with program position information in addition to the spatial arrangement of the classroom in order to seek out an available work space having the proper program materials located therein.

If desired, a printed record of the progress of the learner pairs through the program sequence can be provided by printout means according to a timed measurement or other progress evaluating measures. Another variation is to supply program segment check-out test scores to the learner scheduling means by means of additional input information devices such as punched cards. The results of the check-out tests can then be used to alter the schedule of the learners to whom the tests are given. These results are entered into the computer memory bank in order to properly control the scheduling signals.

In operation, identification characters such as names, name or code patterns, or other abbreviations are assigned to each of the students and the students are initially assigned to work spaces according to these numbers and the guidance means then shows these characters in the character display elements on the panels once the learners' scheduling information which contains these identification characters has been entered into the memory bank and comparator means. As a learner completes a given program segment and signals the guidance means of his completion through use of the completion signalling means, his identification character disappears from the face panel of the guidance means at the work space in which he has been working and reappears at the appropriate work space in the classroom which is unoccupied and at which he will then proceed through the next program segment. Also, if the program sequence takes him into the psycho-motor activity area, the identification character will appear in the second classroom area signal and display panel. In this manner, each of the learners in the classroom can be guided through the various classroom locations as required to complete successive program segments. When completion signals are received from a plurality of learner pairs, the computer may be programmed to switch the learners between the pairs and such switching of pairs is a preferred variation of the present invention.

In view of the above, it is an object of this invention to provide a classroom in which a plurality of learners may engage in paired learning and psycho-motor activities in a manner to increase the effectiveness of the learning occurring in each of these two paired learning program segments.

Another object of the present invention is to provide a classroom for paired learning in which a first area contains paired learning devices and is separated from a second area which contains equipment for psychomotor activities. The separation between the areas is provided for by a divider panel having transparent portions therein.

Yet another object of the present invention is to provide a learner guidance means which is capable of displaying to the learner pairs and to the classroom teacher the positions which should be occupied by each of the learners as he moves through the various program segments.

Yet another object of the present invention is to provide a classroom for paired learning of the class described wherein one of the walls has therein a one-way glass panel to allow nondisruptive observation of the classroom activity.

These and other objects and advantages of this invention will become apparent from the following description and claims. The invention can best be understood by reference to the accompanying drawings illustrating several embodiments of the present invention:

DESCRIPTION OF THE DRAWINGS

FIG. 1 is a plan schematic view of a preferred paired learning classroom configuration;

FIG. 1A is an enlarged plan view of one of the paired learning devices shown in FIG. 1;

FIG. 2 is a plan schematic view of a modification of the classroom configuration of FIG. 1;

FIG. 3 is a front view of the classroom divider panel of FIG. 1 taken on section line 3—3;

FIG. 4 is a front view of the wall opposite the divider panel of FIG. 1 taken on section line 4—4 for illustrating the learner guidance means;

FIG. 5 is an enlarged front view of the learner guidance means of FIG. 4; and

FIG. 6 is a perspective view of one of the classrooms of the classroom configuration of FIG. 1 with the walls removed.

DOUBLE CLASSROOM CONFIGURATION

FIG. 1 illustrates a schematic view of a classroom configuration 10 which is composed of a first classroom 11 and a second classroom 12 which are joined along a common wall 13 and a centrally located observation room 14 which is common to both classrooms. Due to the economy of construction of one observation room for the two classrooms and the sharing of other equipment, this configuration is a preferred form of the present invention. Classroom 11 is formed by floor 15 and rear wall 16 which is perpendicularly connected to common wall 13 at the rear end thereof as illustrated. The opposite end of rear wall 16 is perpendicularly connected to side wall 17 which is parallel to common wall 13 and extends to front wall 18 which is perpendicularly connected thereto. The front wall 18 extends parallel to rear wall 16 from its connection with side wall 17 to doorway 19 which is provided with a hinged door 20 and a door support wall 21 which is connected at right angles to central corridor wall 22 which, in turn, extends toward and connects with observation room 14.

The one-half of common observation room 14 used for classroom 11 has a rear wall 23 which extends on an angle into classroom 11 from its connection with common wall 13 and a connected side wall 24 which is parallel with classroom side wall 17 and which is connected to central corridor wall 22 by forward wall 25. The wall 25 is positioned at an angle with respect to observation room side wall 24. The remaining one-half of observation room 14 used for classroom 12 has rear wall 26 which corresponds to rear wall 23 of the other one-half of the observation room above-described and an observation room side wall 27 and an angled forward wall 28 which connects to a second corridor wall 29. Corridor walls 22 and 29 form observation room corridor 30 by which observers can move into and out of observation room 14. This corridor 30 is provided with hinged doors 31 and 32 in order to reduce the light level in observation room 14 to provide for ease of viewing through one-way glass panels 33, 34, 35 and 36 which are retained within walls 23, 24, 26 and 27, respectively. The use of one-way glass panels for observation of the classroom activities requires that the interior of observation room 14 have a low light level.

The remainder of classroom 12 is formed from door support wall 37 which is perpendicularly connected to corridor wall 29 and which supports hinged door 38. Front wall 39 is co-planar from door support wall 37 and extends to perpendicularly disposed side wall 49 which is parallel to observation room side wall 27. Rear wall 41 extends between side wall 40 and common wall 13 and is parallel to front wall 39.

The classrooms as defined by the walls may be modified by using only three walls to form a triangular room, if desired.

The classroom space of classroom 11 defined by the above-described walls, door and observation room, and its ceiling (not shown) is divided by a divider panel 42 which is provided with hinged doors 43 and 44 on both ends thereof. The divider panel 42 extends substantially the full width of the classroom and with its connected doors extending its effective length, it does extend the full width of the classroom as defined by side wall 17. The divider panel 42 functions to separate a first area 45 from a second classroom area 46. The first defined area is used for containing paired learning devices 47, each of which has a plurality of work spaces, and for presenting paired learning programs to the learners who use the classroom. The second defined area is used for containing equipment for psychomotor activities and for presenting programs of activities which are coordinated with the paired learning program conducted in space 45.

Five paired learning devices 48, 49, 50, 51 and 52 are arranged along a curve as shown in space 45. The curved arrangement increases the visual contact by the learners at the devices over that possible for a straight line configuration of learning devices. This arrangement also provides for the learners to perceive the classroom space before them and relate that physical space, as a function, to the time required to move from work space to work space as they are mastering the learning materials to reach a predesignated completion goal. In this manner, the paired learning classroom functions to require delays in achievement of goals and teaches the learners that they must plan and expend energy over periods of time if they are to reach a desired position in the classroom. This linkage between physical space and the time required for mastery is a means of teaching control over impulsive requirements for immediate gratification and teaches learners that they must project into the future and expend effort to achieve their goals.

Each of the five paired learning devices are designed to accommodate three pairs of learners so that they can work as a pair at one of the work spaces without receiving external stimuli which would distract them from the presented paired learning program. Two additional paired learning devices 53 and 54 are provided in order to accommodate two pairs of learners each.

Simulator area 46 is partially divided into work areas 55, 56 and 57 as shown by outwardly projecting panels 58 and 59 which abut wall 17. Simulator building blocks 60 are shown in area 55 while building panels 61 and corner supports 62 therefor are shown schematically to represent a building panel set in area 56. Area 57 can be used for free expression activities prescribed for certain program segments such as for cutting and pasting activities.

A teacher's desk 63 is also provided in a central position as shown in the first classroom area 45. Also, storage shelves 64 can be set against or attached to one or more of the walls as shown at rear wall 16.

A learner guidance means 65 is shown attached to corridor wall 22 and a similar guidance means 66 is attached to the other corridor wall 29 for classroom 12. Associated equipment cabinet 67 for both of the two guidance means can be stored in corridor 39. The need to use only one equipment cabinet for the two classrooms represents a cost savings feature of the configuration shown in FIG. 1.

Classroom 12 is also divided into a first paired learning area 70 and a second simulator area 71 by a divider panel 72 which has hinged doors 73 and 74 at both sides thereof. Paired learning devices 47 designated individually as 75, 76, 77, 78 and 79 are designed to accommodate three learner pairs each and are arranged in a similar curved fashion as are the paired learning devices in classroom 11 wherein the concave part of the curve faces the observation room 14. As in classroom 11, two double work space paired learning devices 80 and 81 are shown abutting rear wall 41 and front wall 39, respectively.

The teacher desk 82 is shown in a corresponding position to that of desk 63 in classroom 11. Also, storage shelves 83 are arranged along rear wall 41.

Additional storage shelves 84 and 85 are shown attached to common wall 13 in classrooms 11 and 12, respectively.

Side wall 40 is shown with a relatively wide window panel 86 therein. This window can be used to take additional extraneous stimuli into the classroom if the learners using classroom 12 are sufficiently self-disciplined so that they are not distracted by this added stimuli. If they are not, then the window can be covered. When using the classroom for nursery and elementary school-aged children, no window is placed in wall 40.

As in classroom 11, simulator work areas 87, 88 and 89 are formed in stimulator space 71 by panels 90 and 91 which abut side wall 40. Area 87 contains simulator equipment 92, area 88 houses a building panel set 93 and area 89 contains a four-learner easel cluster 94 shown in schematic view for allowing free art drawing and writing expression. The simulator equipment and the paired learning devices 47 rest on classroom floor 95.

Bleacher seat 96 is shown positioned in the center of observation room 14 for use by observers of the activity in the two classrooms 11 and 12.

As shown in enlarged detail in FIG. 1A, each of the paired learning devices 47 are constructed of a generally circular horizontal barrier member 100 which has three up-right barrier panels 101, 102 and 103 connected to the upper surface of the horizontal barrier member 100 as seen by the upper edges thereof and extending radially outward from the central position of the member 100. These three up-right barrier panels divide device 47 into three equiangular work spaces 104, 105 and 106, each of which are designed to accommodate one learner pair. Learner positioning indentations 107 and 108 are formed in the outer edge of member 100 for positioning the learners who use work space 104 toward the materials for presenting the program for paired learning (not shown). Learner seats 109 and 110 are provided for seating the learners using work space 104. Each seat consists of a seat portion 111, a backrest 112 and a support arm 113 which is connected to the underside of device 47. As shown in dotted lines, support bases 114, 115 and 116 are provided to support horizontal member 100 off of floor 15.

Learner seats 117 and 118 are provided for work space 105 as are positioning indentations 119 and 120, respectively, while seats 121 and 122 are provided for work space 106 and corresponding indentations 123 and 124 are also formed in the outer edge of member 100. The seats 117, 118, 121 and 122 are identical to seats 109 and 110.

Work space 104 is provided with a signal panel 125 which is wedge shaped and is secured to the upper portions of up-right panels 101 and 103. This panel has two color-coded electrical contact buttons 126 and 127 which when activated by the classroom teacher or the learners at appropriate times sends signals indicating completion of the program segment presented at work space 104 to learner guidance means 65 in classroom 11. Buttons 126 and 127 can also be shape coded, if desired. Name tag slots 128 and 129 are provided in which to place learners name tags, is desired. Identical signal panels 130 and 131 are provided for work spaces 105 and 106, respectively, for the same purpose. The signal conductors from signal panels 125, 130 and 131 can be run upwardly to the ceiling of the classroom in a preferred variation as in the floor 15, for example, under carpeting in the classroom and thence to the learner guidance means 65.

The two learner pair devices 53, 54, 80 and 81 are of similar construction to device 47 with the modifications as shown.

SINGLE CLASSROOM MODIFICATION

Referring now to FIG. 2, classroom 140 is shown with floor 141, and an observation room 142 at one side thereof. This room is formed by angularly disposed forward wall 143, side wall 144 and rear observation room wall 145 which is angularly connected to classroom wall 146. A one-way glass panel 147 is retained within wall 144 for allowing nondistracting observation of the activities occurring within the classroom 140. Bleacher seat 148 is aligned with panel 147 within observation room 142 to provide a sitting means for the room.

Wall 146 extends the full width of the classroom and is perpendicularly connected to rear wall 149 which extends the entire length of classroom 140. Side wall 150 is perpendicularly connected to the end of wall 149 and extends the full width of the classroom. Front wall 151 is perpendicularly connected to side wall 150 on one end thereof and a door opening 152 is provided in this front wall to provide for hinged door 153 which is attached to door support wall 154. Front wall 151 is coplanar, as shown, with support wall 154 which is connected by one end thereof to corridor wall 155 which is disposed parallel to classroom side wall 146. The opposite end of wall 155 is connected to the front edge of angularly disposed forward wall 143. The observation room 142 is then defined by walls 143, 144, 145, 146 and 155, panel 147 and hinged door 156 which is attached to side wall 146 to exclude light from observation room 142.

The space defined by the above-mentioned classroom walls is divided by divider panel 157 which with hinged door 158 at one end thereof and hinged door 159 at the other end thereof extend the full width of the classroom in order to separate the psycho-motor activities area 160 from the paired learning area 161. As in FIG. 1, two divider panels 162 and 163 provide partial separation of area 160 into three work areas 164, 165 and 166. Simulator equipment 167 shown as building blocks, is stored in work area 164 and building panels 168 are retained in work area 165 while an easel cluster 169 is positioned within area 166 for the same purpose as for classroom 12.

Paired learning devices 170 of the type above described for FIGS. 1 and 2 are arranged in a concave curved pattern facing observation room one-way glass panel 147. Paired learning devices 171, 172, 173, 174 and 175 are provided for accommodating three learner pairs each. Two additional paired learner devices 176 and 177 designed to accommodate two learner pairs each are provided and are identical to devices 53 and 54 in classroom 11 as above described.

A teacher's desk 178 is positioned close to learner guidance means 179 which is attached to corridor wall 155. The learner guidance means is designed to accept completion signals from the signal panels 125, 130 and 131 located on the devices 171-175 and from two similar signal panels (not shown) which are affixed to the double work space paired learning devices 176 and 177.

Storage shelves 180 are attached to rear wall 149 and shelves 181 are attached to wall 145 for the storage of classroom materials and the paired learning program materials.

As in FIG. 1, an equipment cabinet 182 is provided in conjunction with learner guidance means 179 so that electrical conductors can pass through wall 155 from cabinet 182 to the learner guidance means 179 to provide for part of the circuitry and equipment required by this means being stored within the cabinet. By employing micro-circuitry within the learner guidance means 179, cabinet 182 can be eliminated.

Referring now to FIG. 3, a front view of divider panel 72 of classroom 12 is illustrated. Panel 72 is shown rigidly attached to floor 95 and having hinged doors 73 and 74 attached to opposite ends of the divider panel by hinges 190. The hinged doors 73 and 74 are arranged in close relationship to wall 41 and wall 39, respectively. Ceiling 191 extends from the upper edges of wall 39 to wall 41.

Divider panel 72 is formed from a series of spaced upright posts 192, 193, 194, 195, 196, 197, 198 which are rigidly affixed to floor 95 and each of which are connected by the top ends thereof to rail 199. The areas defined by each two adjacent posts, the classroom floor 95 and rail 199 contain transparent plates or panels 200-205 which can be constructed of glass or clear plastic in classrooms requiring strict safety precautions as in classrooms for nursery or elementary school-aged children. These divider plates are made from a transparent material in order to allow the learners in the paired learning area of the classroom to see the activities being conducted within the psycho-motor area so as to motivate them to complete their program segments or subsegments in order to be moved into those activities. The learners in the psycho-motor area are able to see the movement of the other learner pairs within the first area which serves to motivate them to return to the paired learning activities in that area. The transparent character of these plates 200-205 also increases the effective teacher control into the psycho-motor area, since she can clearly observe the learners therein.

In preferred form, divider panel 72 has a height of between three and four feet and extends substantially the full width of the classroom.

Simulator space divider panels 90 and 91 are seen extending above the top-most edge of rail 199. Each of doors 73 and 74 are constructed of a rectangular frame 206 and a middle crossbrace 207. The two doors have the rectangular frames 206 thereof attached through hinges 190 to post 198 for door 73 and to post 192 for door 74. Each of the hinged doors 73 and 74 are provided with an upper transparent panel 208 and a lower transparent panel 209 which are retained by frames 206 and cross-braces 207.

Psycho-motor work area 89 contains an easel cluster 94 which is designed for use by four learners and a two-learner easel 210, both of which are standing easels of the type described in the inventor's copending application entitled "STANDING EASEL FOR CLASSROOM USE" filed with even date hereof. As shown on easel 94, a clip 211 is provided to hold drawing paper 212 on a drawing area. Also provided on easel 94 are instrument holding trays 213 and 214. Similar instrument holding trays 215 and 216 are provided on easel 210. The remaining simulator equipment shown and described for work areas 87 and 88 is not shown in FIG. 3.

LEARNER GUIDANCE MEANS

As shown in FIG. 4, learner guidance means 66 is formed by a cabinet 220 affixed to wall 29 at a convenient distance from the floor 95. The connecting signal lines from the signal panels 125, 130 and 131 of FIG. 1A are shown slightly below the floor level as lines 221 which can be disposed within floor 95 or under a covering carpet (not shown). These lines enter cabinet 220 through casing 222 which is vertically disposed and is attached to wall 29. If desired, this cabinet can be horizontally disposed and aligned within the classroom with the floor plan.

The face panel of guidance means 66 consists of three separated completion signal and guidance display panels 223, 224 and 225 for the psycho-motor area which are located at the left-hand side thereof, a psycho-motor area learner identification panel 226 and a paired learning program learner guidance display panel 227, and a classroom learner identification panel 228. The layout of the learner guidance panels 226 and 227 is a graphic representation of the floor plan of classroom 12. Identification tags having identifying characters for each learner using the classroom can be retained by identification panel 228. Learner display means are presented within panels 223, 224, 225 and 227 in order to display the successive classroom positions which should be occupied by each of the learners. The learners are identified for this purpose by their identifying characters on the display panels 223, 224, 225 and 227 by the learner display means, each of which present the character identifications of all of the learners to the classroom teacher and to the learners themselves.

Also shown in FIG. 4 are storage shelves 83 and 85 attached to walls 41 and 13, respectively. Each of these shelves consist of a series of divided compartments 230. As shown by variable height arrow H, these shelves may be raised or lowered on the walls to provide for different ages and sizes of learners. One-way glass panels 35 and 36 are shown being supported in the central portions of walls 26 and 27, respectively, in panel frames 231 for panel 35 and 232 for panel 36. As shown, the observation room 14 is formed of walls 26, 27 and 28 between floor 95 and ceiling 191. Corridor panel 29 is shown connected to support wall 37 which extends over hinged door 38 as illustrated.

Referring now to FIG. 5, the face panel of the learner guidance means 66 is shown in greater detail. Psycho-motor area signal and guidance display panel 223 contains a series of signal buttons 240 and character display elements 241 which are illustrated as circular buttons and square display elements. The signal buttons provide a completion signalling means and are actuated by pressing in order to send a completion count signal to the completion signal recording circuitry of the learner guidance means 66. The square display elements provide learner display means and consist of electronically cotnrolled character forming devices covered by an appropriate protective transparent material. Each of the elements 241 is capable of displaying different characters for each of the learners using the classroom. One button and a display element pair 242 are provided for each learner using the psycho-motor area 87 corresponding to panel 223 so that upon completion of the program segment scheduled for this area a signal can be sent to the completion signal recording means contained within the learner guidance means to indicate completion of that segment by each of the learners in turn as they complete that segment. Thus for a 30 learner classroom of the type described no more than about ten learners would be in work area 87 at the same time so that 10 button and display element pairs are provided on panel 223. In a like fashion the same number of identically disposed button and display element pairs 242 are provided for both panels 224 and 225.

Psycho-motor area learner identification panel 226 is divided into three areas 243, 244 and 245 which graphically represent the three work areas 87, 88 and 89 of psycho-motor area 71, respectively. Each of these panel areas 243, 244 and 245 have a plurality of holders therein for removably holding identification tags, if desired. In a classroom used by 30 learners approximately ten holders are needed in these panels since there would not be a greater number of the learners scheduled into those areas at any one time as above stated.

The guidance display panel 227 for the paired learning program area consists of a graphic representation of the arrangement of the paired learning devices in classroom 12 and the work spaces thereof. Two character display elements 246 are provided for each of the work spaces in the classroom. These elements differ from display areas 241 above-described only in that the area is circular rather than square as shown for panels 223, 224 and 225. The up-right panels of the paired learning devices are illustrated by the radial line symbols 247.

Learner identification panel 228 is provided with a plurality of serially numbered holders for removable learner identification or name tags. Each of the learners using the classroom are provided with two tags one of which goes in a holder on panel 228 the other of which is moved between the tag slots illustrated as slots 128 and 129 provided in the signal panel for each of the work spaces in the classroom and the holders in the identification panel 226.

Casing 222 is shown at the bottom of cabinet 220 of the learner guidance means 66.

The following control circuitry means are contained within either the display cabinet 220 or the accessory cabinet 67 in corridor 30:

1. A completion signal recording means for receiving and forming a permanent record of the completion signals received from the completion signalling means on the work space signal panels and the signal buttons on panels 223, 224 and 225.
2. A learner scheduling means for accepting scheduling information for each of the learners including initially determined program sequences and check-out test scores. A punched card reader is usable as this means. The learners as identified by assigned characters and other intelligence for this purpose.
3. A classroom spatial arrangement means for accepting and retaining coded intelligence as to the layout of the classroom, the number of work spaces in the first area and the number of work areas in the second area, for retaining a count of the unused work positions and their position within the classroom, and for retaining a fix on which work positions contain given program segments when these segments are permanently assigned to certain work positions. This means can accept punched card input if desired.
4. A memory bank and comparator means for storing intelligence and for handling the sequentially received scheduling and completion signals so as to route the learners to the unused work spaces. The comparator means is preset by the intelligence received from the spatial arrangement means so that when completion and scheduling signals are received, they are compared with existing space and area positions, and guidance signals are then sent from the comparator means.
5. A guidance signalling means for converting the guidance signals from the comparator means to control the characters displayed by the learner display means (character display elements).
6. An information printout means for providing a permanent record of each learner's classroom performance and activities. This means can be a conventional character printout unit, if desired.

The combined circuitry of these various means can be arranged so that when a completion signal is given for a learner before his check-out test score for that program segment is received by the learner scheduling means, the character display element for his present classroom position does not disappear before reappearing in the next assigned position, but merely flashes in the fixed position until this deficiency of information is cured.

In operation, learner guidance means 66 is provided with initial input information as to the series of program segments and psycho-motor activities to be moved through by each of the learners. This information can be standardized for all of the learners or can be varied depending on the initial skills of each of the learners. Each of these cards specifies an identification for each of the learners and as these cards are read by the input card reader the identifications of the learners appear in a distributed fashion in the display elements 246. The learners then move to their indicated work spaces in the classroom and begin the program for paired learning after appropriate initial instructions from the classroom teacher. Upon completion of segment one of the program by a pair of learners, either the classroom teacher or the learners themselves actuate electrical contact buttons 126 and 127 provided for their work space as illustrated in FIG. 1A for work space 104. The signals generated by these buttons are transmitted to learner guidance means 66 through lines 221 as shown in FIG. 4. These signals enter the above-described combined circuitry within guidance means 66 or its associated cabinet 67. This circuitry then selects a next classroom work space position for these two learners.

When the program calls for the use of the psycho-motor area, the student's character identification will appear in one of panels 223, 224 or 225, depending upon the work area therein to which they are to be scheduled. When the activity is to be completed in this program segment is finished, the classroom teacher or the learner pushes the associated button 240 of the signalling button and display element pair 242. The actuation of button 240 sends a completion signal to the completion signal recording circuit in order to flash the student's identification to the next display element which would then be on panel 227 which would place the student back into the paired learning device area 70 of the classroom. The identification tags which are initially given to the learners can be moved with them as above-described and placed in panel 226 or in the slots provided in the signal panels affixed to the top central portions of the paired learning devices.

In another modification of learner guidance means 66, the display areas can be constructed of variable character presentation abbreviations thereof can be used as an indication of their next position.

FIG. 6 illustrates classroom 12 with the walls thereof removed. Front floor line 260 is shown as is corridor wall line 261 and the observation room wall lines 262, 263 and 264, the last of which connects to common wall line 265. The common wall line is connected to rear wall line 266. Side wall line 267 is provided to preserve the perspective view of area 71. This view of classroom 12 is taken from the corner of the room adjacent to the door 38.

Paired learning device 79 is shown with the numerical designations as given for FIG. 1A. Cabinet doors 268 are provided for each of support bases 114, 115 and 116 which are shown as being of box form. Conventional door handles are also provided for doors 268.

Paired learning device 81 is shown in rear perspective view in which rear panel 269 is shown as having a cut-out base portion 270 and rounded upper corners 271 and 272. The centrally disposed up-right barrier panel 273 is also shown as having a rounded upper corner. The other paired learning devices 75, 76 77, 78, 79 and 80 also have rounded upper corners for the upright barrier panels thereof as does the rear panel 274 of device 80.

A rear portion of support base 275 of device 81 is seen framed by cut-out portion 270.

As shown the room divider panel posts illustrated by posts 193, 194, 196 and 198 can also be connected at the floor line by floor rail 276.

The learner seats 109, 110, 121 and 122 can be provided as shown with support posts 277 to provide greater stability.

The through-ways into area 71 provided by the hinged doors attached to divider panel 72 can be seen at either end thereof.

The paired learning devices as shown without the attached signal panels are described and claimed in the inventor's copending application entitled "PERCEPTION CONVERGENCE DEVICE FOR PAIRED LEARNING."

USE OF CLASSROOM

The use of the described classrooms will be described by reference to classroom 12 illustrated in FIG. 6.

At the beginning of a paired learning program, the learners are seated in three pairs at the work spaces 104, 105, and 106 of the three partner paired learning devices 75–79 and the first program segment is given to them either in the form of audio and/or visual stimulus presentation means, including workbooks, or audial stimulus propagating means or by tactile stimulus means such as braille printing.

The first of the learner pairs to complete program segment one would then move either by directions from the classroom teacher or the learner guidance means above referred to to a new work space within the paired learning area 70 or they would move into area 71 in order to engage in psycho-motor activities. The first learner pair to complete a first segment of the program could be moved by the teacher or instructed by the learner guidance means for a move to one of the work spaces of paired learning devices 80 and 81. These paired learning devices are placed in the classroom in order to provide for a larger number of work spaces than needed for the number of learners using the classroom and for use in specialized program segments for selected learners.

It is frequently desirable to allow more than a single learner pair to enter the psycho-motor area at the same time in order to gain the best use of the simulator equipment which requires interaction between the learners. When this is necessary, various learner pairs may be moved into the simulator area as they complete program subsections. The learners can then return to either the work spaces which they left or to new work spaces depending upon their completion of the program segment assigned for their past work spaces. It is also possible to switch the various learners between the learner pairs so that learners who have completed a given program segment can monitor and evaluate other learners. In this manner a plurality of learners can be moved through various segments in a paired learning program and given all of the above-mentioned learning experiences.

Due to the increasing number of moves and the complexity of the inter-relationship of the changing learner pairs with respect to the program segments and the work space positions within the classroom and the use of the psycho-motor areas, it is preferable to provide the classroom teacher and the learners with a learner guidance means which specifies their next position in the classroom once they have completed a given program segment or subsegment rather than expecting the teacher to handle this complex choreography. The completion signalling means disclosed herein may be designed to provide for the learner guidance means with more complex information than the simple completion count signals described. Accordingly, information of other types such as a partner identification, test results, time of completion, and evaluative information can be provided for.

While the invention has been described in connection with different embodiments thereof, it will be understood that it is capable of further modification, and this application is intended to cover any variations, uses or adaptations of the invention following, in general, the principles of the invention and including such departures from the present disclosure as come within the known or customary practice in the art to which the invention pertains, and as may be applied to the essential features hereinbefore set forth and as fall within the spirit and scope of the invention or the limits of the appended claims.

What is claimed is:

1. A classroom adapted for paired learning comprising an area for presenting a paired learning program to learner pairs; a plurality of paired learning devices located within said first area, and each of said paired learning devices presenting at least one work space for use by a single learner pair; learner guidance means for displaying information to indicate the classroom position to which each of the learners in a pair should proceed when given paired learning program segments have been completed, and the classroom positions for the learners indicated by said guidance means with respect to the classroom floor plan.

2. A classroom as defined in claim 1 wherein said paired learning devices are arranged within said classroom in a curve having at least one concaved portion for facilitating the perception of the classroom space as a function of the time required to complete the segments of said paired learning program when different program segments are learned at separate work spaces.

3. A classroom as defined in claim 1 wherein at least five paired learning devices are contained within said classroom, each of said devices accommodating a plurality of learner pairs.

4. A classroom as defined in claim 3 wherein each of said paired learning devices provide a plurality of work spaces, each work space accommodating a single learner pair.

5. A classroom as defined in claim 3 wherein each of said paired learning devices accommodates three learner pairs.

6. A classroom as defined in claim 3 wherein at least two additional paired learning devices are contained within said classroom, each of said devices accommodating a plurality of learner pairs.

7. A classroom as defined in claim 1 wherein completion signalling means is provided to permit signalling of the completion of a given program segment from at least a plurality of said paired learning devices.

8. A classroom as defined in claim 7 wherein separate completion signalling means are provided for each work space in said classroom.

9. A classroom as defined in claim 1 wherein completion signalling means are located within said classroom for supplying completion signals to said learner guidance means for the learners whereby information is supplied to said guidance means to allow the displayed information to be time-synchronized with program segment completion.

10. A classroom as defined in claim 1 wherein said learner guidance means contains control means for accepting and processing input scheduling information for the learners using said classroom, said information including character identification for each of said learners.

11. A classroom as defined in claim 1 wherein said learner guidance means contains control means for accepting and processing information on the classroom spatial arrangement including available work spaces and positionally fixed paired learning program segments.

12. A classroom as defined in claim 1 wherein said learner guidance means contains control means for accepting and processing check-out test scores information for the learners using said classroom.

13. A classroom as defined in claim 12 wherein completion signalling means are located within said classroom for supplying completion signals to said learner guidance means and wherein said learner guidance means displays a warning signal at a fixed position thereon when check-out test score information has not first been supplied to said control means.

14. A classroom as defined in claim 1 wherein said learner guidance means includes learner guidance character display means for displaying character identifications for the learners using said classroom.

15. A classroom as defined in claim 14 wherein separate learner guidance character display means are provided for each classroom work space position and wherein the character identifications displayed thereby move to successive classroom work space positions depending upon the input information received by said learner guidance means.

16. A classroom as defined in claim 1 wherein said learner guidance means includes a printout means for providing a permanent record of the input information supplied to said guidance means and the movement of the learners through the successive program segments.

17. The process of providing a paired learning program for a plurality of learner pairs who complete program subsegments and segments at a plurality of work spaces contained in a plurality of paired learning devices arranged in a classroom, comprising the steps of initiating a paired learning program subsegment between a learner pair so that both learners of the pair mutually interact to achieve joint mastery of the program subsegment; mutually checking out completion and mastery between the learner pair at the end of each subsegment; signalling by the learner pairs of their checked out subsegment completion and mastery; and learner guiding between the plurality of work spaces by the learner pairs themselves depending on their completion and mastery of the program subsegments.

18. A process as defined in claim 17 wherein said process is effected in a classroom having a first area for containing the paired learning devices and a second area for presenting a program of psycho-motor activities which is coordinated with said paired learning program and including the step of learner guiding between the paired learning work spaces and the psycho-motor activities area depending upon program subsegment and segment completion and mastery.

19. A process as defined in claim 17 wherein the majority of paired learning devices are arranged in the classroom along a concave curve and wherein said learner guiding step includes the perceiving by the learner pairs of the classroom physical space, including the work spaces as a series of subgoals which are reached overtime successively on the basis of completion and mastery of program subsegments.

20. A process as defined in claim 17 including the step of being guided by the learners to and from additional paired learning devices not arranged along the concave curve.

21. A classroom comprising a divider panel resting on the floor of said classroom for separating said classroom into a first area for presenting a paired learning program to learners and a second area for presenting a program of psycho-motor activities which is coordinated with said paired learning programs, a plurality of paired learning devices located within said first area arranged along a concave curve so that the learners perceive the classroom physical space as a series of subgoals which are reached overtime successively on the basis of mastery of predesignated program segments, each of said paired learning devices having a plurality of workspaces, each work space accommodating a single learner pair, and said divider panel having at least portions thereof adapted to allow the learners using said classroom to see the activities occurring in each of said first and second areas.

22. A classroom as defined in claim 21 wherein at least one of said walls has a one-way viewing panel therein and an observation room partly defined by said wall for allowing non-disruptive observation of the classroom activity.

23. A classroom as defined in claim 21 wherein at least one through-way is provided in said divider panel.

24. A classroom as defined in claim 21 wherein at least two through-ways are provided at the two ends of said divider panel.

25. A classroom as defined in claim 24 wherein openable doors are provided for said through-ways.

26. In a classroom having walls interconnected to define a classroom space divided into a first area in which a paired learner program can be presented to learner pairs when positioned at work spaces and a second area in which a program of psycho-motor activities which is coordinated with said paired learning program can be presented to learner pairs, the improvement comprising the arrangement of the plurality of paired learning devices along a concave curve and cooperating with respect to one another to provide means for the learner pairs to perceive the classroom physical space as a series of subgoals which are reached overtime successively on the basis of mastery of predesignated program segments.

27. A classroom defined by claim 26 wherein each paired learning device contains at least two work spaces.

28. A classroom as defined in claim 26 wherein at least five paired learning devices are contained within said classroom, each of said devices accommodating a plurality of learner pairs.

29. A classroom as defined in claim 26 wherein each of said paired learning devices accommodates three learner pairs.

30. A classroom as defined by claim 26 wherein at least two additional paired learning devices not in the arrangement of the concave curve are contained within said classroom, each of said devices accommodating a plurality of learner pairs.

* * * * *